Jan. 7, 1930.    B. CATALINE ET AL    1,742,755

VALVE SPRING

Filed Dec. 10, 1926

Inventors
Benton Cataline &
Eugene C. Richards
By
Blackmore, Spencer & Faul
Attorneys Patented Jan. 7, 1930

1,742,755

UNITED STATES PATENT OFFICE

BENTON CATALINE AND EUGENE C. RICHARD, OF FLINT, MICHIGAN, ASSIGNORS TO GENERAL MOTORS CORPORATION, OF DETROIT, MICHIGAN, A CORPORATION OF DELAWARE

VALVE SPRING

Application filed December 10, 1926. Serial No. 153,822.

This invention relates to motor vehicles and particularly to the springs used in the operation of cam actuated valves of internal combustion engines.

Owing to the high speed at which modern internal combustion engines must operate, it has been determined that the valve spring must build up a maximum spring pressure in 1/180 of a second at 3600 R. P. M. motor speed, and this pressure must be immediately released and the mechanism brought to a stop in an equal length of time.

As each spring has an appreciable weight in each coil there is a tendency for each coil, due to its inertia, to remain behind when the spring is released and this tendency to lag will be increased as the weight and number of coils is increased. This condition in connection with the rapid reversal of action of the spring causes a series of vibrations within the spring which is known as "dancing", and this "dancing" produces objectionable noise, especially when it synchronizes with some other sound or vibration of the motor, and also causes a fluttering of the valve. This dancing is injurious to the life of the spring and prevents the valve from properly seating.

To eliminate this "dancing" and the objectionable defects it is necessary to reduce the size of the wire, the size of the coils, or the number of the coils, and it is the object of this invention to make it possible within a given height, to produce a valve spring which will fulfill certain given requirements with respect to loads and deflections and at the same time produce less "dancing" of the coils of the spring.

With the conventional spring there is always throughout its range of action the full number of coils with their corresponding weight to cause "dancing" of the coils. It has been found through a series of experiments with springs of different sized wire and number of coils that the weight of the wire in the free coils directly affected the "dancing" of the coils. By decreasing the size of the wire and number of active coils the "dancing" diminished and began to show only at certain intervals of speed. Therefore, it became the problem to produce a spring in which the "dancing", if it occurred at all, was outside the driving range of the motor.

We found that if we had a spring of several coils of light wire, which would close solid just before the maximum opening of the valve, and placed it on a spring of one or two coils of heavy wire, the "dancing" of the coils was practically nil, but the one or two coils were taking all of the load and the variations in manufacture were such that the stress and load were built up to such an extent that the coils broke.

These experiments led to our discovery that we could place the coils that were to compress solid on the bottom and make the free or upper coils of a different pitch and thus have a continuous spring as is shown in the drawing in which Figure 1 is a section through the cylinder block of a multicylinder engine at one of the valves showing in dotted outline so much of an internal combustion engine as is necessary to illustrate our invention, parts being shown in section for purposes of clearer illustration.

Figure 1:
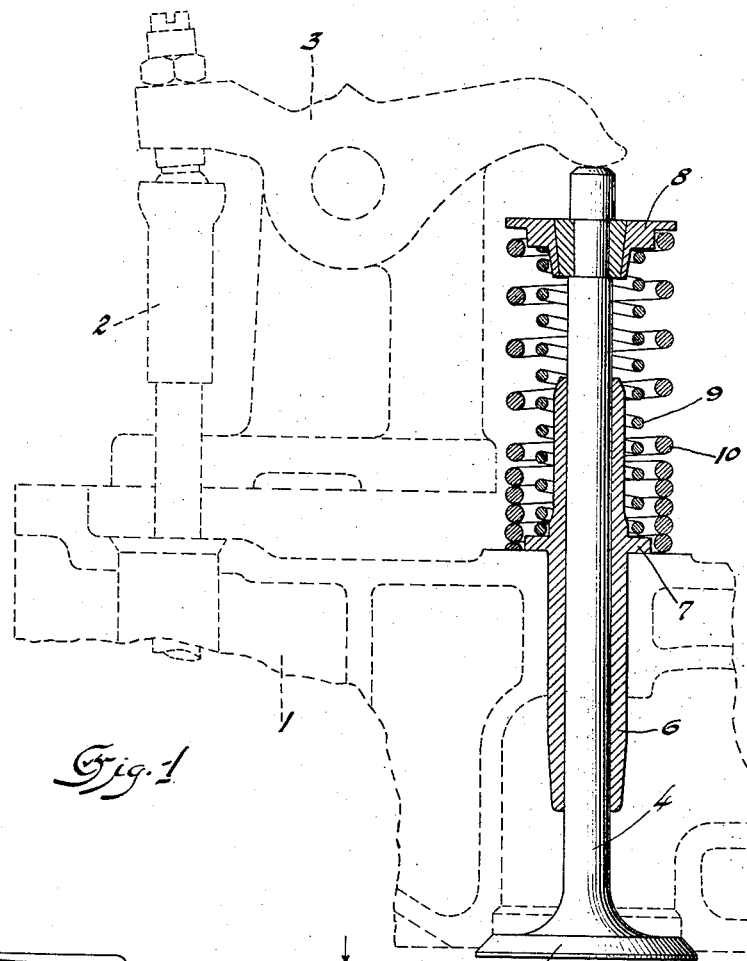

In the drawing 1 designates an internal combustion engine of the conventional type, 2 the stem operated from the cam shaft (not shown), 3 the lever for operating the valve stem 4, having the valve 5 and operating through the sleeve 6. This sleeve 6 has an integral collar 7 seated on the engine block and confined between this collar and a second collar 8 secured to the upper end of the valve stem 4 is the spring 9, while a second spring 10, which forms the object of our invention, is confined between the engine block and the collar 8, and surrounds the spring 9.

By referring to Figure 1 it will be seen that the section through the metal of the variable pitch coil spring is uniform at all parts thereof and the diameter of the coils, or of the cylindrical shape of the coil spring, is the same throughout its length.

The springs are also unrestricted or unimpeded, i. e., they are free to assume their own shape uninfluenced by any outside source such as an entwined coil spring, etc.

While in Figure 1 but a single valve and engine cylinder are shown it is to be understood that the invention is applicable to all the valves of all the cylinders of a multicylinder internal combustion engine.

Figures 2, 3, 4:
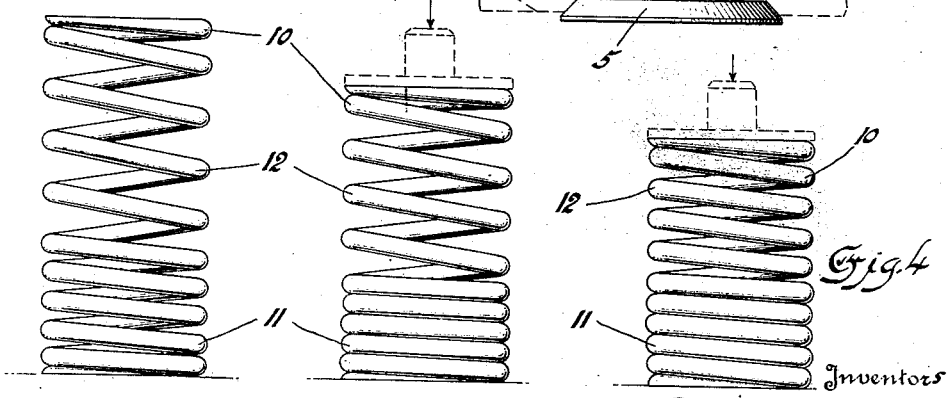
Figure 2 shows a free length or untensioned view of our spring.
Figure 3 shows the spring compressed as it appears in valve-closed position, the arrow representing the load.
Figure 4 is a view similar to Figure 3 but with the valve in open position.

As will be noted from Figure 2, which shows the free length of the spring, the lower coils 11 are of less pitch than the upper or active coils 12 and when partially compressed within the required limits, Figures 3 and 4, these lower coils are shut or solid but the upper or active coils are left spaced from each other; therefore, when the valve is open, Figure 4, the lower coils 11 are closed leaving the upper coils 12 to take care of the load and deflection necessary to close the valves. With the deflection shown in Figures 3 and 4 only the upper coils 12 tend to produce dancing, but by the application of our spring arrangement any dancing which might occur will be beyond the driving range of the motor.

The loads required at valve open and valve closed position, height to be occupied by the spring, and allowable fibre stress, will determine the size of the wire, diameter of the coil, total number of coils, and number of coils to be closed.

The lower coils need not be wound with a constant pitch but may have a variable pitch or a combination of constant and variable pitches. This is equally true of the upper coils.

In designing a spring for an engine it is necessary to have a certain load at valve-closed position, Figure 3, a larger predetermined load at valve-open position, Figure 4, and maintain a fibre stress which is not so excessive.

Having thus described our invention what we claim as new is:—

1. In an internal combustion engine, a valve, a spring for operating said valve, certain of the coils of said spring being shut when the valve is in open or closed position.

2. In an internal combustion engine, a valve, a spring for operating said valve, certain of the coils of said spring being shut and certain other coils open when the valve is in open or closed position.

3. In an internal combustion engine, a valve, a spring for operating said valve, the lower coils of said spring being shut and the upper coils open when the valve is in closed position.

4. In an internal combustion engine, a valve, springs for operating said valve, a solid portion at one end of one of said springs and an open portion at the other end.

5. In an internal combustion engine, a valve, a spring for operating said valve, a compressed solid portion at the lower end of said spring and an open portion at the upper end.

6. In combination with an internal combustion engine having intake and exhaust ports, valves controlling said ports, springs for causing said valves to engage their seats, said springs comprising coils of varying pitches, all the coils at one end having the same pitch and all the coils at the second end having the same pitch but different from the pitch at the first end.

7. In combination with an engine having a plurality of ports, a plurality of valves for controlling said ports, and a plurality of unrestricted or unimpeded springs for operating said valves, said springs having a plurality of coils of a constant pitch at one end, and a plurality of coils of a constant pitch but different from the first named pitch at their other ends.

8. In combination with an engine having a plurality of ports, a plurality of valves for controlling said ports, and a plurality of unrestricted or unimpeded springs for operating said valves, said springs having a part of their coils shut at all times when in operative position.

In testimony whereof we affix our signatures.

EUGENE C. RICHARD.
BENTON CATALINE.